Jan. 7, 1936.  W. H. DUMBLE  2,026,777
AUTOMATIC VARIABLE SPEED TRANSMISSION
Filed Nov. 10, 1934  2 Sheets-Sheet 1

INVENTOR,
W. H. Dumble,
BY
F. E. Maynard,
ATTORNEY.

Jan. 7, 1936.  W. H. DUMBLE  2,026,777
AUTOMATIC VARIABLE SPEED TRANSMISSION
Filed Nov. 10, 1934   2 Sheets-Sheet 2

INVENTOR;
W. H. Dumble,
By F. E. Maynard,
ATTORNEY.

Patented Jan. 7, 1936

2,026,777

UNITED STATES PATENT OFFICE 2,026,777

AUTOMATIC VARIABLE SPEED TRANSMISSION

William H. Dumble, East Bakersfield, Calif., assignor of one-half to Ugo Antongiovanni, Bakersfield, Calif.

Application November 10, 1934, Serial No. 752,482

8 Claims. (Cl. 74—293)

This invention is a power transmission mechanism.

An object of the invention is to provide an automatic action, variable speed mechanism. A further object is to provide a direct-drive planetary gear means incorporating and controlled by a fluid circulating apparatus, and to provide an automatic centrifugal governor for the latter apparatus.

An object, also, is to provide a supplementary clutch means for directly connecting elements of the planetary gear means independently of the fluid controller of the gear device.

Additionally, an object is to provide a manually operative means whereby to vary, at will, the speed of the driven element of the planetary means and predetermine the automatic action of the governor in effecting a direct coupling of the driving and the driven elements of the planetary train.

In connection with the fluid circulating apparatus it is an object to provide means for adjusting the rate of fluid flow under plunger pressure in plunger chambers, and it is an object to provide means to effect a gradual choking of the fluid flow in the control circuit and eliminate shock at the moment of effecting a direct drive connection in the train.

The invention consists in certain advancements in this art as set forth in the ensuing disclosure and having, with the above, additional objects and advantages as hereinafter developed, and whose construction, combination and details of means, and the manner of operation will be made manifest in the description of the invention herewith illustrated; it being understood that modifications, variations and adaptations may be resorted to within the scope, principle and spirit of the invention as it is more directly claimed hereinafter.

Figure 1:
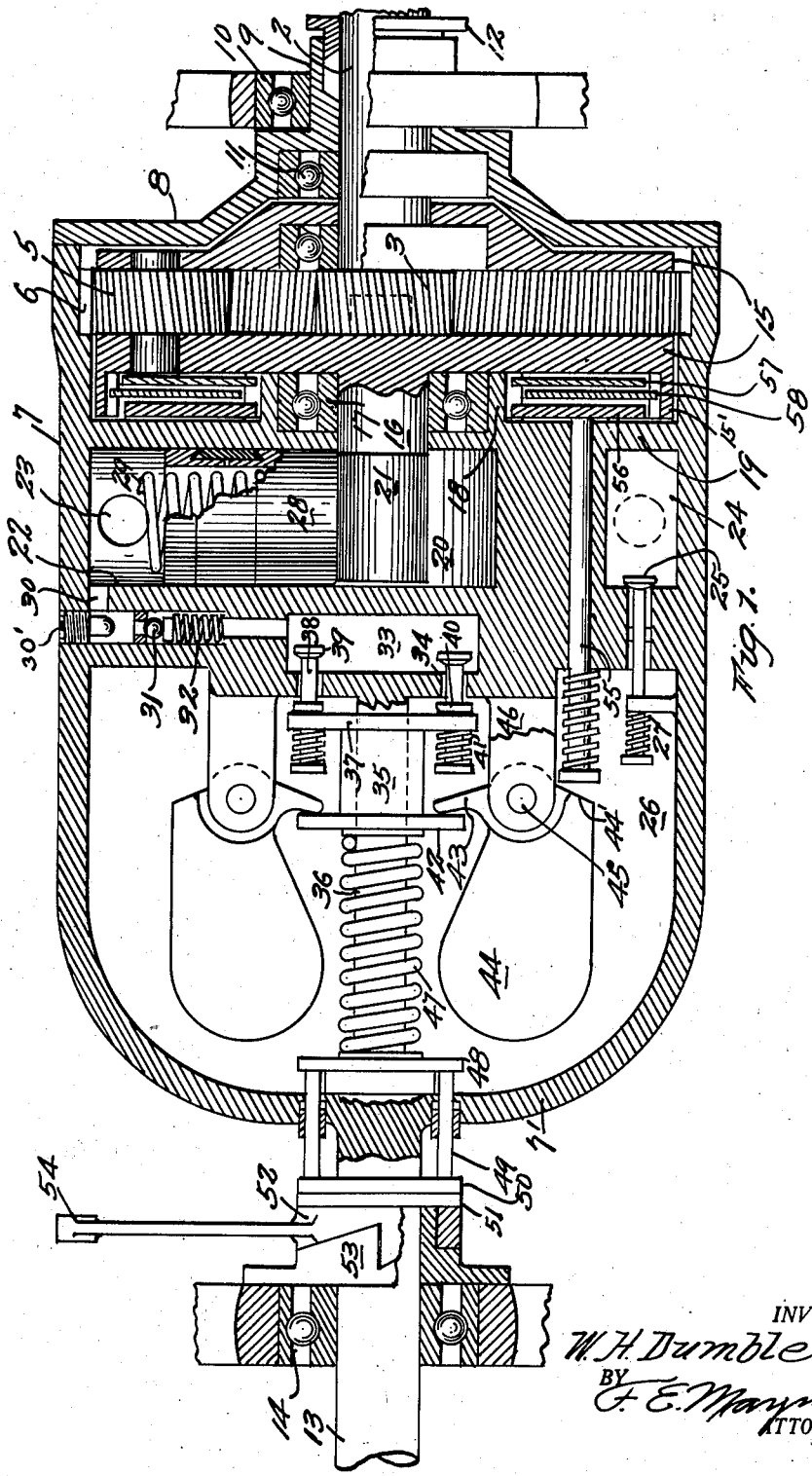
Figure 1 is an axial section of the transmission, with certain parts in elevation.
Figures 2, 3:
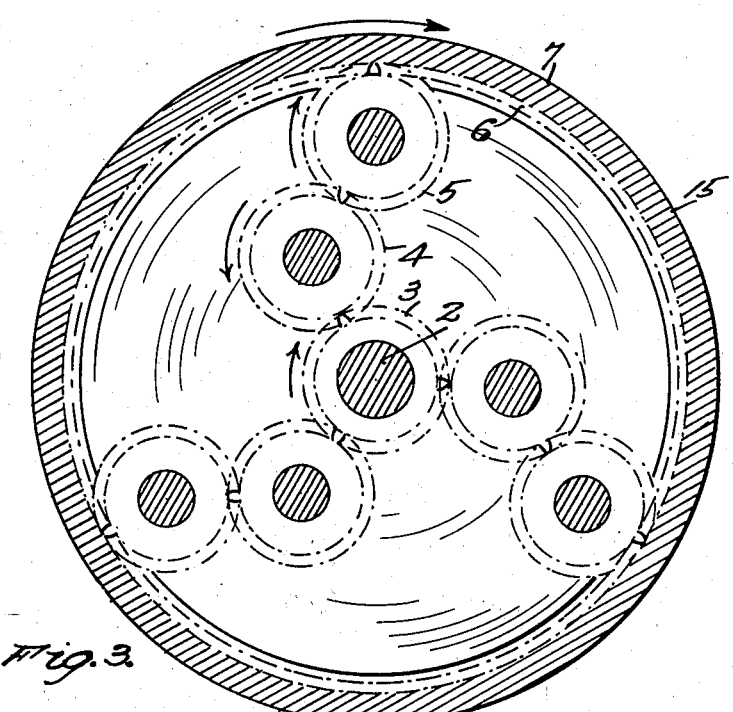
Figure 2 is a transverse section on the axial plane of pump plungers of the system.
Figure 3 is a transverse section showing the planetary gear train in end elevation.

In its illustrated form the transmission includes a drive shaft 2 being connected to any suitable clutch, not shown, of any prime mover; the shaft 2 normally idling with the motor in the conventional manner. Fixed on the shaft 2 is a sun gear 3 in constant mesh with a set of intermediate gears 4 which constantly engage a set of planetary gears 5, these constantly meshing in an internal gear 6 which is a fixed part of a rotary housing 7.

One end of the housing 7 is closed by a head 8 which has a trunnion 9 supported in a suitable bearing 10 and receiving the drive shaft 2; the trunnion having anti-friction bearings 11 for the shaft. A packing gland 12 on the trunnion prevents oil from leaking out of the housing along the shaft 2.

The opposite end of the housing 7 has a shaft 13 extended therefrom coaxial with the drive shaft 2 and supported in suitable bearing 14, and constituting the propeller shaft of the mechanism.

The sets of gears 4 and 5 are suitably mounted on one face of a rotary member 15 having a spindle 16 journalled in an anti-friction bearing 17 provided in a hub 18 formed on a side face of a transverse wall 19 forming a part of the rotary housing 7.

The wall 19 has a central pocket 20 in which there is turnable a suitable impeller on cam 21 fixed on the spindle 16 of the rotary gear carrying member 15. Radially extending from the pocket 20 is a suitable number of cylindrical bores 22 whose outer ends are closed, as by the housing 7 and each of which has a lateral port 23 communicating with a respective recess 24 in the wall 19. Each recess 24 has an inlet valve 25 to admit a charge of fluid from the housing chamber 26; the valves 25 being automatically closed by respective springs 27.

In each bore 22 is a complementary, packed plunger 28, preferably of hollow form and whose inner, closed end forms a seat for an expansion spring 29 which outwardly seats against the housing 7.

If the shaft 2 is idling and the housing 7 is standing still the planetary gears will cause the carrier member 15 and its spindle 16 to turn in a direction reverse to that of the shaft 2; the internal gear forming a fulcrum. The result is that the cam device 21 on the spindle 16 will thrust the several plungers, in succession, outward against their springs 29 and fluid trapped in the bores 22 will be expressed through escape ports 30 in the wall 19 and past check valves 31 in ducts 32 which lead inwardly to a central cell 33 in the wall. The cell 33 has a number of bleeder outlets 34 to the housing chamber 26.

A feature of the invention is the provision of means to adjust the flow capacity of the escape ports 30 and thereby the ratio of turns of the housing to those of the drive shaft 2, and a further feature is the provision of means to automatically close the bleeder outlets 34 and practically lock the housing to the drive shaft 2 by stopping the plunger action in the bores.

Each escape port 30 has an adjustable screw-plug or flow restrictor 30' allowing only a given stream of fluid to flow past without setting up such a resistance to the plunger action that there will be caused a rotation of the housing in the same direction that the drive shaft is turning. That is, that an idling of the motor will be permitted before the restriction of flow at the ports 30 will create such a back resistance that the housing 7 will turn. After that, as the motor speed is increased the housing speed is also increased.

At a desired housing speed the housing is automatically "direct connected" to the shaft 2 by the action of a governor which includes a sleeve 35 slidably mounted on an axial stem 36 in the housing 7 and having a flange 37 in which is slidably supported a set of valves whose heads 39 work in the bleeder outlets 34 of the cell 33. The valves have shanks 38 of different length projecting from the sleeve flange 37 into the cell and have shoulders 40 pulled out against the flange by means of springs 41 mounted on portions of the valve shanks extended beyond the flange 37. The sleeve also has a flange 42 which is engaged by inwardly extending lugs 43 of longitudinally extending weight arms 44 having pivots 45 in bracket parts 46 of the cross wall 19.

When the housing is rotating centrifugal force tends to swing the weights 44 outwardly about their pivots and the lugs 43 are pressed against the flange 42 so that the sleeve 35 is shifted away from the cell 33 and the flange 37 carries the valves 39 toward their seats at the mouths of the outlets 34. The differential lengths of the valve stems cause the valves to seat successively and finally close all the outlets without undue shock as the choked fluid reacts on the plungers 28.

Means are provided whereby to control the speed of rotation of the housing 7 and the sequential action of the governor device to effect direct connection of the drive shaft 2 and the housing, through the planetary set. In the form shown, this means includes a governor spring 47 on the stem 36 and compressed between the sleeve 35 and a collar 48 sliding on the stem and having a set of rods 49 passing through and packed in the end wall 7' of the housing. The rods connect with an exterior collar 50, on the propeller shaft 13, which engages end thrust bearing 51, which, in turn, engages a cam collar 52 slidably and turnably mounted on the shaft 13 and engaging a fixed, complementary cam 53. The cam collar 52 has a lever 54 operated by manual effort to vary the position of the spring collar 48 and thus increase or decrease the pressure of the spring 47 on the governor sleeve 35 and thereby control the speed of the housing and which will be necessary to cause the governor to act and close the bleeder valves and secure direct drive from the planetary gears to the propelled housing.

Further, a more positive clutch drive is provided to connect the planetary carrier 15 and the housing 7. As here shown the clutch includes a set of push bars 55 passing through the wall 19 and adapted to be engaged by faces 44' of the weights 44 as these are actuated centrifugally. The inner ends of the bars 55 are fixed to a discal ring 56 which is slidably interlocked with the hub 18 of the wall 19, as is, also, another ring 57 which is adapted to lap against the near side face of the carrier 15. An intermediate discal ring 58 is splined on a flange 15' of the carrier and disposed between the rings 56—57. Thus the governor will automatically close the clutch 56—57—58 and connect the carrier 15 to the housing wall 19.

What is claimed is:

1. A power transmission including a drive shaft and a power take-off including a fluid reservoir, a planetary gear system associating the shaft and the said take-off, a fluid pressure and circulating device controlling the drive reaction of said system on the take-off, adjustable means in said device to determine relative rotation between the shaft and the take-off, and governor means for automatically effecting a stoppage of the fluid circulation and thereby to cause to be made a direct drive connection between the shaft and the take-off and a direct drive means for directly combining the take-off and the said system.

2. A transmission as set forth in claim 1 and in which the governor includes means motivated by centrifugal force and operative on said drive means.

3. A power transmission including a drive shaft having a sun gear, a housing including a fluid reservoir, a rotary carrier turnably mounted on the shaft and having a system of planetary gears connecting said sun gear and the housing, a plurality of fluid circulating plungers and bores therefor in the housing, means connected to the carrier for operating the plungers in one direction to expel fluid, means for returning the plungers on suction stroke, and normally fixed means manually adjustable to control the escape flow of expelled fluid.

4. A power transmission of the type set forth in claim 3, and including a governor controlled by rotation of the housing for effecting a stoppage of fluid flow and thereby effect direct drive through said planetary to the housing.

5. A power transmission as set forth in claim 3, and including a governor centrifugally controlled to effect a stoppage of fluid flow and thereby cause a direct drive to be produced from the planetary to the housing; said governor including a plurality of valve devices operative successively in a common chamber to gradually cut off the escape flow to eliminate drive shock.

6. A power transmission including a drive shaft having a sun gear, a housing including a fluid reservoir and a cell having inlet check valves, a rotary carrier having a system of planetary gears connecting said sun gear and said housing, a plurality of fluid circulating plungers and bores therefor in the housing, means connected to the carrier for operating the plungers to expel fluid from the bores past the check valves to said cell, a governor to effect stoppage of flow of the fluid and cause direct drive to be produced through said planetary to the housing and including a set of successively closing outlet valves in said cell.

7. A power transmission including a housing having a system of radial bores, a plunger in each bore, a drive shaft, a planetary gear set driven by said shaft and being in mesh with a housing gear to drive the housing, a rotary carrier for the gear set having means to operate said plungers, a reservoir in the housing, check valves controlling inflow to the bores and supply valves for the bores, a plurality of valves to stop all outflow from the bores under plunger pressure, and a centrifugal governor for successively closing the last named valves.

8. A transmission as set forth in claim 7 and including a clutch device operated by the governor to co-operatively connect the said carrier and the housing.

WILLIAM H. DUMBLE.